United States Patent Office 3,010,922
Patented Nov. 28, 1961

3,010,922
HARDENABLE AMINO-ALDEHYDE CONDENSATES CONTAINING UREA-OCCLUSION COMPOUND
Horst Kosche, Duren, Rhineland, Germany, assignor to Henkel & Cie. G.m.b.H., Dusseldorf-Holthausen, Germany, a corporation of Germany
No Drawing. Filed Apr. 24, 1957, Ser. No. 654,654
Claims priority, application Germany June 27, 1956
10 Claims. (Cl. 260—21)

This invention relates to improved hardenable amino-aldehyde condensates.

It is known that products which may be hardened into aminoplastics, i.e., aminoplasts, may be formed from condensation products of aldehydes and organic amines or amides which contain at least 2 hydrogen atoms bound to nitrogen in the molecule. These hardenable aminoplast-forming products may be used, possibly with the addition of filler, as molding compositions or bonding agents, i.e., glue. In connection with the hardenable aminoplast-forming products which are soluble or swellable in water, the same are particularly adaptable for use after the addition of water as glues and particularly for the gluing of wood, as for example, wood veneers.

The glues formed by the addition of water to the hardenable amino-aldehyde condensates, i.e., the aminoplast-forming materials, have, however, the disadvantage of being excessively hard and brittle. This brittleness would seriously effect the strength of the glued joint and, in particular, where the gluing was effected at low pressure so that the glue joint could not be maintained thin, as for example in the gluing together of wood veneers. While it was possible to reduce the brittleness of such glued joints by the addition of fillers such as starch or wheat flour, the same would additionally result in the reduction of the water resistance. Similarly, attempts to improve the strength of the glues by the addition of water-insoluble fatty acid salts such as zinc stearates did not always prove satisfactory.

One object of this invention is an improved hardenable amino aldehyde condensation product and, more particularly, an improved aqueous glue containing a hardenable amino-aldehyde condensate. This, and still further objects will become apparent from the following description:

In accordance with the invention, it has been found that the characteristics of hardenable amino-aldehyde condensates and particularly the binding strength and flexibility of aqueous glues containing hardenable amino-aldehyde condensates may be improved by the addition of a urea occlusion compound as, for example, 1 to 20 and preferably 5 to 15% by weight based on the amino-aldehyde condensate.

By hardenable amino-aldehyde condensates, i.e., amino-plast-forming products, there are understood, in accordance with the invention, both water-soluble and water-swellable or dispersible condensation products of aldehydes with compounds which contain at least two $NH_2$-groups in the molecule. The $NH_2$-groups can be present as amide and/or amine groups. There are preferably concerned condensation products of urea and/or melamine with formaldehyde, but in place of these condensation products, there may also be used condensation products of dicyandiamide, guanidine, thiourea or other substances of similar structure or their mixtures.

The term "urea-occlusion compounds," as used herein, is intended to designate the compounds discovered by F. Bengen and studied by W. Schlenk ("Annalen," vol. 565 (1949), pages 204 to 240). (These compounds are commonly known under the name "urea-adducts.") The occluded organic substance is contained in the compound in a framework of urea or thiourea molecules of tube-like structure.

The ability of organic substances to form occlusion compounds with urea or thiourea is not substantially affected by the chemiacl constitution of the compounds. Accordingly, the compounds which may be occluded by urea can belong to the most varied classes of substances, such as, for example, hydrocarbons or any compounds which are to be considered derivatives of hydrocarbons, such as alcohols, aldehydes, ketones, carboxylic acids, carboxylic acid amides, sulfonic acid amides, esters, ethers, nitrogen compounds, amines, halides, etc. The functional groups may, in this connection, be present one or more times in the molecule so that dicarboxylic acids, diols, polyethers, polyesters, etc. can also form urea occlusion compounds.

To a much greater extent than by the chemical constitution, the suitability of organic compounds for the formation of urea occlusion compounds is effected by the spatial molecular structure so that compounds are suitable for the said purpose if they contain at least 6 carbon atoms in the molecule and if they have an elongated molecular structure the lateral extent of which is sufficiently small to fit into the tubular urea framework. Further details with regard to this can be noted from the aforecited article by Schlenk. Accordingly the number of the above indicated classes of substances which are capable of forming urea occlusion compounds is limited to a relatively small number of compounds.

The production of urea-occlusion compounds is well known and easy to carry out. The compound to be occluded is mixed with an excess of urea, in which connection at least one of the two compounds to be reacted with each other should be present in liquid or dissolved state. This is assured for instance by operating at temperatures which are above the melting point of the compound having the lowest melting point and below the decomposition temperatures of both of the compounds. The urea-occlusion compounds will then form immediately or upon the cooling of the mixture. It is also possible to operate in the presence of solvents for the urea and/or for the compound to be occluded, in which connection it is sufficient to moisten one of the two starting materials or the mixture with the solvent, for instance water, or organic solvents and particularly water-soluble solvents of lower molecular weight, i.e., which are not capable of occlusion. It is also possible to employ a plurality of solvents and to operate for instance with concentrated aqueous or alcoholic urea solutions. Should the reaction product obtained in accordance with any of the methods indicated here still contain free urea, it can be removed by treatment with water-soluble organic solvents which are not capable of occlusion, but this is not necessary for the use of the occlusion compounds in accordance with the invention.

The urea occlusion compound is merely mixed with the hardenable urea aldehyde condensate. Both the urea aldehyde condensate and the urea occlusion products are preferably in dry, workable, as for example powdered, form. The mixture may contain fillers, as fibres or powders of cellulose, cellulose derivatives or cellulose-containing materail, starch, dextrin, condensates of starch and formaldehydes or other products derived from starch. At least about 1% by weight of the occlusion compound based on the urea aldehyde condensate should be used. It is preferable, however, to use larger quantities of the urea occlusion compound, as for example about 5 to 15% based on the urea aldehyde condensate. It is possible at times to use even larger quantities but quantities which will inhibit the hardening of the urea aldehyde condensate should, in general, be avoided. For this reason, quantities of the urea occlusion compound of more than 20% by weight based on the urea aldehyde condensate should normally be avoided.

If the aminoplast-forming products, in accordance with the invention, however, contain substances which split off aldehydes under the conditions of the hardening, the quantity of the urea occlusion compounds can be even larger. Substances which split off aldehydes under the hardening conditions are, for instance, hexamethylene tetramine or paraformaldehyde. The quantity of aminoplast-forming condensation product, urea-inclusion compound and aldehyde-splitting substance is to be so determined that in all cases there is present a product which is hardenable when heated. In special cases it is possible to omit the hardenable condensation product of amino compound and aldehyde, but in such cases there must be present for each hydrogen atom bound to nitrogen at least one aldehyde group in order to obtain hardenability. Upon heating to hardening temperature, as for example to 100 to 250° C. and preferably 130 to 180° C., the aminoplast is formed by reaction of the free urea or the urea which is liberated from the occlusion compound at the hardening temperature with the aldehyde which is liberated. Accordingly also such mixtures are also referred to here as "aminoplast-forming products."

If the condensation is effected with products in accordance with the invention, stirred in water, it is possible to work at the customary bonding temperatures. If the new products, however, are used in dry state as molding compositions which may contain up to 70% by weight of inert fillers, it is advisable to operate at temperatures above 130° C.

By the addition of occlusion compounds, many advantages are obtained which express themselves in different fields, depending on the aldehyde-forming condensation product, its type of use and the specific occlusion compound employed. The bonding layers obtained from conventional aminoplast-forming condensation products which can for instance bind wood or other fiber material together and particularly those having a cellulose base, are thus at times hard and brittle so that a bonding of good strength can be obtained only by reducing the thickness of the bonding layer for which it is necessary to employ high pressures in the bonding. To be sure, attempts have been made to reduce the brittleness of such bonding layers by adding fillers such as, for instance, starch or wheat flour, to the glues, but this resulted in a reduction of the resistance to water. Similarly it was attempted to improve the strength of glues by the addition of water-insoluble fatty acid salts, particularly zinc stearate, but the effect obtained was not always satisfactory. If the urea-occlusion compounds are added to the glue, in accordance with the invention, there is obtained an excellent increase in the elasticity of the glue joint or of the plastic molding composition. This effect is not restricted to occlusion compounds of water-insoluble substances but is also obtained in the case of water-soluble compounds or compounds dispersible in water, as for example in the case of water-soluble salts of amines capable of occlusion having 10 and more and preferably 12 to 18 carbon atoms in the molecule.

The increase of the elasticity of the glue joint is of particular importance in the gluing together of veneers since in such gluing only very low pressures can be applied and it is therefore not possible to keep the glue joint very thin by the application of high pressures.

If the products in accordance with the invention are used as glues, they are stirred in the known manner with water and, in the absence of highly viscous addition substances, preferably with 0.3 to 1 times the quantity by weight of water so as to form a more or less viscous glue solution which is employed in the customary manner for the gluing. The surfaces to be glued together are coated with the condensation product and, possibly after superficial drying of the glue solution, the glued surfaces are pressed together with pressures of, for instance, 1.5 to 30 kg./cm.$^2$. The gluing itself can be carried out in the customary manner at room temperature, i.e., at temperatures of 10 to 35° C. or even at temperatures higher than 35° C., particularly temperatures of 80 to 180° C.

It has proven preferable, although not necessary, to use urea occlusion compounds, the occluded compound of which are liquid at the gluing temperatures in the free, non-occluded state. If the glues are to harden for instance at room temperatures, it is preferable to operate with occlusion compounds of organic compounds which are liquid at room temperature, for example singly or multiple unsaturated fatty acids or fatty acid alcohols. The same occlusion compounds can be used if the gluing is to be carried out at higher temperatures. In such cases, however, there may also be used occlusion compounds of organic compounds of higher melting point such as, for instance, those of myristic, palmitic or stearic acid as well as of the corresponding fatty alcohols.

The occlusion compounds of the above mentioned fatty acids or fatty alcohols are to be considered merely illustrative examples of the substances which can be employed, but in their place there may also be used occlusion compounds of other organic compounds which, however, should not be volatile at the gluing temperature.

The invention furthermore comprises the use of urea occlusion compounds which, upon contact with water and possibly at elevated temperature, have an acid reaction or can form compounds having an acid reaction. This includes primarily the salts of occlusion of amines and strong inorganic or organic acids which dissociate upon contact with water and thus liberate the strong acid. Examples of strong inorganic acids primarily include mineral acids, such as sulfuric acid and the hydrohalic acids, but amine salts of strong organic acids can also be used. In addition to the occlusion compounds of amine salts of strong acids, there also enter into question as acid-forming substances occlusion compounds of organic nitrogen compounds which contain a halogen atom, particularly an active chlorine atom, bound to nitrogen, such as the halogen amides, the halogen amines derived from carboxylic acids or sulfonic acids. Upon contact with water, these compounds split off active halogen which dissociates to form hydrohalic acid. The hardening of the aminoplast-forming condensation products is accelerated by the acid reaction. At the same time the organic compounds introduced as the occlusion compound have the aforementioned brittleness-reducing action on the glue joint.

The invention is applicable particularly in connection with the gluing of wood and especially in the so-called joint gluing of veneers when veneers are to be assembled along their longitudinal sides to form large plywood boards. In the case of joint gluing which is effected in special joint gluing machines, the gluing conditions, that is the temperature of the heating device and the time of stay of the veneers to be glued together in the machine is generally set empirically in such a manner that a gluing of sufficient strength is obtained during the passage-through of the material. The temperature of the heating device can vary within the range of 80 to 180° C. For this purpose of use, the brittleness of the glue joint is particularly disturbing.

It has furthermore been found that the glues, in accordance with the invention, have a much longer storage life than the same glues without the addition of urea-occlusion compounds.

In the case of the use of the materials, in accordance with the invention, as glues, i.e., after stirring with water, their application in the field of resin-bonded wood-fiber or wood-shaving compositions is particularly advantageous when the products of the invention contain urea-inclusion compounds of hard paraffins, i.e., paraffins of melting points above 50° C. and preferably up to 100°

C. The hard paraffins exert a swelling-delaying action on the wood and therefore contribute to increasing the rigidity of the artificial wooden masses.

The following examples are given by way of illustration and not limitation:

Example 1

By reacting technical oleic acid (Acid No.=195.5, Saponification No.=197.0, Iodine No.=126.5) with urea in the presence of methyl alcohol, there is produced an occlusion compound which contains about 70% urea and 30% fatty acid.

90 grams of the finely pulverized occlusion compound are mixed with 850 grams of a dry, pulverulent, hardenable condensation product of melamine and formaldehyde. There are furthermore added as a hardener 35 grams $NH_4Cl$ and the mixture is stirred with 0.5 times its weight of water into an aqueous solution which can easily be brushed on a surface and which has a relatively long pot life. This pot life depends on the temperature and is about 10 hours at 10° C., about 6 hours at 15° C., and about 3½ hours at 20° C.

The glue prepared in this manner is then applied in an apparatus known per se to the edges of veneer pieces. They are glued together in joint gluing machines of customary construction, the glue-coated edges being pressed together between veneers and heated by means of heating devices, for instance heating rails, to 80 to 180° C. The temperature of the heating devices is regulated empirically as a function of the speed of passage of the pieces of veneer through the machine and of the rate of hardening of the synthetic resin used which can be varied in particular by hardening accelerators in such a manner that a gluing of satisfactory strength is obtained. In all cases there is obtained a glued joint of excellent elasticity.

Example 2

100 parts by weight of a mixture of 80% by weight methyl alcohol and 20% by weight water are saturated with urea at 45° C. and heated, after the addition of 10 parts by weight dodecyl amine hydrochloride to 50° C. until all the material has dissolved. After cooling to 20° C., the occlusion compound crystallizes out in the form of scales having the luster of mother of pearl. The crystals are suction filtered, washed with methyl alcohol at 15° C. on the filter and dried at 30° C. in a vacuum drying cabinet. There are obtained 38 parts by weight of an occlusion compound which contains about 22% by weight dodecylamine hydrochloride. The compound has the following analysis:

48.0% N
20.7% O
3.42% Cl 90 parts by weight of a water-soluble hardenable condensation product of melamine and formaldehyde are intimately mixed with 10 parts by weight of the pulverized occlusion compound, prepared in accordance with the above. The mixture has an excellent storage life. For use, this mixture is stirred with 0.3 to 0.6 times the quantity by weight of water and used in the manner described in Example 1 for joint gluing. There is obtained a more elastic glue joint than when operating without the addition of the urea-occlusion compound. Similar effects are obtained if octodecyl-amine hydrochloride or octodecenyl amine hydrochloride is used instead of the dodecylamine hydrochloride.

Example 3

An adipic acid occlusion compound which on basis of its acid number of 414 contains 54% by weight adipic acid is prepared from adipic acid and a saturated methanolic urea solution at 10° C.

94.5 parts by weight of a powdered melamine-formaldehyde condensation product which is swellable in water are intimately mixed with 5.5 parts by weight of the above finely pulverized occlusion compound. There is obtained a glue powder of excellent storage life. By stirring in water, there is obtained a liquid glue which hardens both when cold or hot.

Instead of the melamine resin there can also be used the same quantity of a urea or thiourea aldehyde condensation product or of another aminoplast-forming hardenable condensation product which is hardenable by acid and soluble or swellable in water.

Example 4

81 parts by weight of a powdered, hardenable, water-soluble condensation product of melamine and formaldehyde are mixed with 10 parts by weight of the finely powdered urea occlusion compound of dodecylaminehydrochloride prepared in accordance with Example 2. The product which has a good storage life is stirred with water forming a glue of long life and excellent bonding strength which is ready for immediate use. In case of the gluing of wood, the water-soluble melamine resin can be replaced by a melamine resin which is still swellable in water or a mixture of a soluble and a swellable resin.

Example 5

As the urea component, a powdered water-soluble condensation product of urea and formaldehyde or thiourea and formaldehyde in accordance with Example 4, is mixed with the same quantities by weight of dodecylaminehydrochloride-urea occlusion compound and paraformaldehyde. The glue, stirred in water, is particularly readily flowing and is characterized, as compared with an addition of only dodecylamine hydrochloride, by a longer life and a good bonding strength.

Example 6

75 parts by weight of a water-insoluble condensation product which, however, is still swellable in water consisting of melamine and formaldehyde are mixed intimately with 15 parts by weight of a ureadodecylaminehydrochloride occlusion compound and 10 parts by weight of paraformaldehyde. If 30 to 70 parts by weight of this mixture are mixed with 70 to 90 parts by weight of the customary pressboard fillers such as sawdust, cellulose cuttings, fabrics, glass fibers or ground stone, there is obtained a rapid press material. The hardened, pressed products prepared from this press material have a noticeably better elasticity than pressed products which are obtained from customary press materials with ammonium chloride as hardener.

Instead of melamine resins there can also be used other aminoplasts in water-insoluble condition or in only swellable condition such as urea resins, thiourea resins or dicyandiamide resins.

Example 7

12 kg. of a powdered water-soluble ureaformaldehyde condensation product are treated with 0.5 kg. ammonium chloride and 3 kg. of a powdered urea occlusion compound of paraffin which contains about 30% by weight paraffin of a melting point of 44° C. This mixture is stirred with about the same quantity by weight of water to form a readily flowing resin solution of low viscosity. The solution is sprayed onto 100 kg. of wood shavings moved about in a mixer which, after a good mixing and impregnation with the resin solution, are used in a manner known per se for the production of wood-chip materials. The wood-chip boards produced in this manner do not exhibit any spots as a result of irregularly paraffined portions and furthermore the strength of the chipboards is not reduced by the paraffining.

The ammonium chloride serving as hardener can be replaced by cyanuric acid chloride or by 0.3 kg. of the occlusion compound of urea and decylaminehydrochloride or a mixture of 0.3 kg. of the occlusion compound of dodecylamine hydrochloride and 0.1 kg. of the occlusion compound of urea and dodecylamine. When the last-mentioned mixture is used, the hardening is less strongly accelerated than when using ammonium chloride or when using solely the occlusion compound of urea and decylamine hydrochloride, but on the other hand the life of the glue solution is increased.

Instead of the water-soluble urea resin, there can also be used a melamine resin which is soluble, swellable or dispersible in water.

If the paraffin occlusion compound is replaced by occlusion compounds of solid or wax-like paraffin-like residues, such as produced in the hydrogenation of carbon monoxide in accordance with the Fischer-Tropsch method or by occlusion compounds of fatty acids, fatty alcohols, aliphatic amines having 10 to 18 carbon atoms or natural waxes, such as montan wax, substantially the same good results are obtained.

I claim:

1. A hardenable amino-aldehyde condensate containing in the proportion between 1 and 20% of a preformed urea-occlusion compound, said amino-aldehyde condensate being the condensation product of an aldehyde with a compound containing at least two amino groups in the molecule, said compound being a member selected from the group consisting of the reaction product of formaldehyde with a member of the group consisting of urea, melamine, dicyandiamide, guanidine, thiourea and mixtures thereof, said urea-occlusion compound being prepared by the reaction of urea and an organic compound having at least six carbon atoms in the molecule until saturation occurs, said organic compound being a member selected from the group consisting of alcohols, aldehydes, ketones, carboxylic acids, amides, sulfonamides, esters, ethers, amines and their salts, N-halo amides, N-halo-sulfonamides and N-halo amines.

2. An adhesive for use in an aqueous medium containing a hardenable amino-aldehyde condensate and about 1 to 20% by weight of a preformed urea-occlusion compound, said amino-aldehyde condensate being the condensation product of an aldehyde with a compound containing at least two amino groups in the molecule, said compound being a member selected from the group consisting of the reaction product of formaldehyde with a member of the group consisting of urea, melamine, dicyandiamide, guanidine, thiourea and mixtures thereof, said urea-occlusion compound being prepared by the reaction of urea and an organic compound having at least six carbon atoms in the molecule until saturation occurs, said organic compound being a member selected from the group consisting of alcohols, aldehydes, ketones, carboxylic acids, amides, sulfonamides, esters, ethers, amines and their salts, N-halo amides, N-halo-sulfonamides and N-halo amines.

3. A hardenable amino-aldehyde condensate for use as an adhesive when admixed with water containing about 1 to 20% by weight of a preformed urea-occlusion compound, said amino-aldehyde condensate being the condensation product of an aldehyde with a compound containing at least two amino groups in the molecule, said compound being a member selected from the group consisting of the reaction products of formaldehyde with a member of the group consisting of urea, melamine, dicyandiamide, guanidine, thiourea and mixtures thereof, said urea-occlusion compound being prepared by the reaction of urea and an organic compound having at least six carbon atoms in the molecule until saturation occurs, said organic compound being a member selected from the group consisting of alcohols, aldehydes, ketones, carboxylic acids, amides, sulfonamides, esters, ethers, amines and their salts, N-halo amides, N-halo-sulfonamides and N-halo amines.

4. Powdered amino-aldehyde condensate for use as an adhesive when mixed with water containing about 1 to 20% by weight of a powdered preformed urea-occlusion compound, said amino-aldehyde condensate being the condensation product of an aldehyde with a compound containing at least two amino groups in the molecule, said compound being a member selected from the group consisting of the reaction products of formaldehyde with a member of the group consisting of urea, melamine, dicyandiamide, guanidine, thiourea and mixtures thereof, said urea-occlusion compound being prepared by the reaction of urea and an organic compound having at least six carbon atoms in the molecule until saturation occurs, said organic compound being a member selected from the group consisting of alcohols, aldehydes, ketones, carboxylic acids, amides, sulfonamides, esters, ethers, amines and their salts, N-halo amides, N-halo-sulfonamides and N-halo amines.

5. A substantially dry powdered adhesive for use in an aqueous medium containing a hardenable amino-aldehyde condensate being swellable in water and about 1 to 20% by weight based on the amino-aldehyde condensate of a preformed urea-occlusion compound, said amino-aldehyde condensate being the condensation product of an aldehyde with a compound containing at least two amino groups in the molecule, said compound being a member selected from the group consisting of the reaction products of formaldehyde with a member of the group consisting of urea, melamine, dicyandiamide, guanidine, thiourea and mixtures thereof, said urea occlusion compound being prepared by the reaction of urea and an organic compound having at least six carbon atoms in the molecule until saturation occurs, said organic compound being a member selected from the group consisting of alcohols, aldehydes, ketones, carboxylic acids, amides, sulfonamides, esters, ethers, amines and their salts, N-halo amides, N-halo-sulfonamides and N-halo-amines.

6. Adhesive according to claim 5 in which the organic compound of said urea-occulusion compound is liquid at a temperature of 10° C.

7. Adhesive according to claim 5 in which said urea-occlusion compound is an occlusion compound prepared from urea and a fatty acid containing at least six carbon atoms, said fatty acid having an elongated molecular structure, said fatty acid being occluded in a framework of a member selected from the group consisting of urea and thiourea in a tube-like structure.

8. Adhesive according to claim 5 in which said urea-occlusion compound is prepared from urea and a member selected from the group consisting of salts of amines and strong inorganic and organic acids, said urea-occlusion compound dissociating in water to give an acidic reaction.

9. Adhesive according to claim 5 in which said amino-aldehyde condensate is a member selected from the group consisting of melamine, formaldehyde condensates, urea formaldehyde condensates and thiourea formaldehyde condensates.

10. Adhesive according to claim 9, in which said urea-occlusion compound is an occlusion compound of a member selected from the group consisting of urea and thiourea and a member selected from the group consisting of fatty acids, fatty alcohols, aliphatic amines and their salts, paraffin and natural waxes.

References Cited in the file of this patent

UNITED STATES PATENTS

| | | |
|---|---|---|
| 2,564,925 | Pollard | Aug. 21, 1951 |
| 2,662,873 | Kaess et al. | Dec. 15, 1953 |
| 2,755,263 | Schuermann | July 17, 1956 |